(No Model.)
W. H. BAKER & B. A. OBORN.
HARROW OR CULTIVATOR.
No. 478,072.      Patented June 28, 1892.
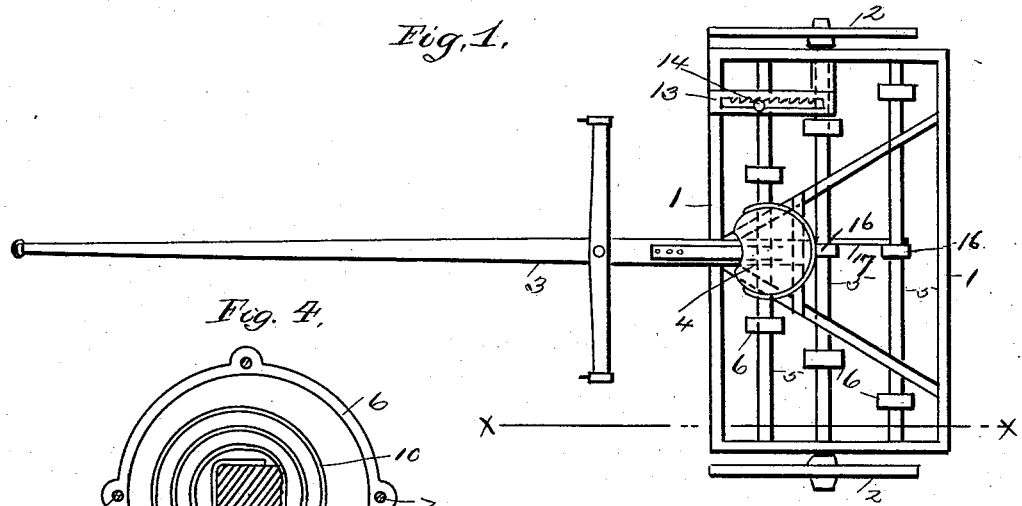
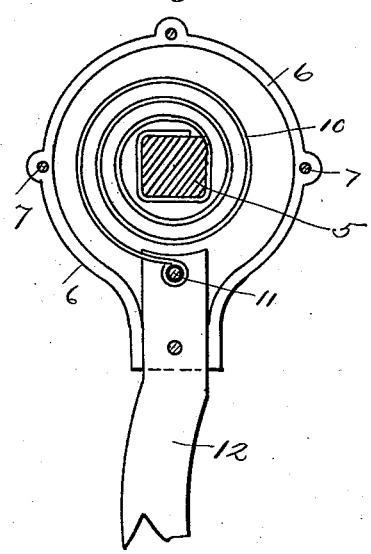
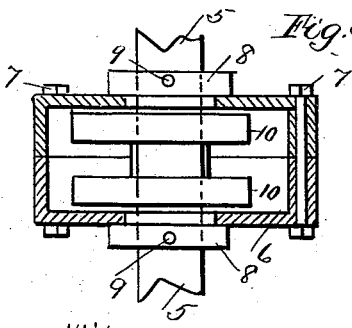
Witnesses:
H. E. Harrison
J. A. Herron
Inventors:
W. H. Baker
B. A. Oborn
per O. D. Levis Atty.

UNITED STATES PATENT OFFICE.

WILLIAM H. BAKER AND BENJAMIN A. OBORN, OF ETNA, PENNSYLVANIA.

HARROW OR CULTIVATOR.

SPECIFICATION forming part of Letters Patent No. 478,072, dated June 28, 1892.

Application filed March 21, 1892. Serial No. 425,831. (No model.)

*To all whom it may concern:*

Be it known that we, WILLIAM H. BAKER and BENJAMIN A. OBORN, citizens of the United States, residing at Etna, in the county of Allegheny and State of Pennsylvania, have invented certain new and useful Improvements in Harrows or Cultivators; and we do hereby declare the following to be a full, clear, and exact description of the invention, such as will enable others skilled in the art to which it pertains to make and use the same, reference being had to the accompanying drawings, which form a part of this specification.

Our invention relates to an improved cultivator or harrow; and it consists in certain details of construction and combination of parts, as will be fully described hereinafter.

In the accompanying drawings, Figure 1 is a plan view of our improved cultivator or harrow, which is constructed in accordance with our invention. Fig. 2 is a side sectional elevation of the same. Fig. 3 is a side sectional elevation of a part of our improved apparatus, showing the manner in which the several bars are coupled together. Fig. 4 is an enlarged sectional elevation of one of the spring-blades. Fig. 5 is a sectional plan view of the same.

To construct a harrow or cultivator in accordance with our invention, we provide a frame 1, of a suitable size and form of construction, and mount the same on wheels 2. Secured in this frame 1 is a series of bars 5, each rigidly fixed in position and fitted with a number of cultivator or harrow teeth 12. These teeth 12 are set into a casing 6, annular in shape and mounted on the square arms 4 by means of two bushings 8, held in position by set-screws 9. This casing is constructed in two sections 6 and secured together by bolts 7, passing transversely through the same. Placed within this casing 6 are two coil-springs 10, one end of which is secured to the bars 5 and the other to the teeth 12 by means of a bolt 11. Attached to the frame 1 is a pole 3, doubletree, &c., for the purpose of hitching horses thereto. Attached to the frame 1 in a suitable position is a circular rack-bar 13, which engages with a vertical lever 14, connected to one of the bars 5. These bars 5 are loosely connected together by means of cranks 16 and a connecting-bar 17 in a manner that the forks may be operated collectively by means of the said lever 14.

By means of an apparatus such as described the same may be used as a cultivator or harrow, and should any of the teeth be brought in contact with a stationary obstruction the same will revolve back and be brought into position by the springs 10.

Having thus described our invention, what we claim, and desire to secure by Letters Patent, is—

The herein-described harrow or cultivator, consisting of the frame 1, the bars 5, secured therein, the teeth 12, secured in the casing 6, the bushings 8 to render the said casings loose on the bars 5, the springs 10, one end of which is attached to the bars 5 and the other to the tooth 12, the lever 14, and the rack-bar 13 for elevating and lowering the said teeth, all arranged and combined for service substantially as and for the purpose described.

In testimony that we claim the foregoing we hereunto affix our signatures this 1st day of January, A. D. 1892.

WILLIAM H. BAKER. [L. S.]
BENJAMIN A. OBORN. [L. S.]

In presence of—
JOHN S. KENNEDY,
I. A. CARLINE.